US006948895B2

(12) United States Patent
Buff

(10) Patent No.: US 6,948,895 B2
(45) Date of Patent: Sep. 27, 2005

(54) WALL MOUNTED CARGO SECURING SYSTEM

(76) Inventor: Samuel Wayne Buff, P.O. Box 602, 96 Country Dr., Marion, NC (US) 28752

( * ) Notice: Subject to any disclaimer, the term of this patent is extended or adjusted under 35 U.S.C. 154(b) by 0 days.

(21) Appl. No.: 10/621,993

(22) Filed: Jul. 17, 2003

(65) Prior Publication Data

US 2005/0013676 A1 Jan. 20, 2005

(51) Int. Cl.[7] .................................................. B60P 7/08
(52) U.S. Cl. ......................... 410/104; 410/97; 410/102
(58) Field of Search ................................. 410/102, 104, 410/105, 116, 97; 24/265 CD, 115 K; 248/499

(56) References Cited

U.S. PATENT DOCUMENTS

| | | | | |
|---|---|---|---|---|
| 3,713,616 A | * | 1/1973 | Bowers ...................... 410/105 |
| 3,850,113 A | * | 11/1974 | Sichak ........................ 410/104 |
| 4,094,044 A | | 6/1978 | Coker ..................... 24/68 CD |
| 4,248,558 A | * | 2/1981 | Lechner ...................... 410/104 |
| 4,273,487 A | | 6/1981 | McLennan .................. 410/105 |
| 4,602,756 A | * | 7/1986 | Chatfield ............... 248/223.41 |
| 4,928,602 A | | 5/1990 | Duczkowski, Jr. et al. . 104/111 |
| 5,409,335 A | * | 4/1995 | Beck ........................... 410/105 |
| 5,516,245 A | | 5/1996 | Cassidy ...................... 410/101 |
| 5,674,033 A | * | 10/1997 | Ruegg ........................ 410/104 |
| 5,695,163 A | | 12/1997 | Tayar ......................... 248/243 |
| 5,772,315 A | | 6/1998 | Shen .......................... 362/396 |
| 5,800,106 A | | 9/1998 | Miller ......................... 410/117 |
| 5,823,724 A | | 10/1998 | Lee ............................. 410/104 |
| 5,993,127 A | | 11/1999 | Shinn ......................... 410/100 |
| 6,270,301 B1 | | 8/2001 | Dunlop ....................... 410/115 |
| 6,350,089 B1 | | 2/2002 | Tekavec ...................... 410/106 |
| 6,390,744 B1 | | 5/2002 | Parkins ....................... 410/106 |
| 6,533,513 B2 | | 3/2003 | Kanczuzewski et al. .... 410/152 |
| 6,626,623 B2 | * | 9/2003 | DeLay ........................ 410/116 |
| 6,644,901 B2 | * | 11/2003 | Breckel ....................... 410/104 |
| 6,712,568 B2 | * | 3/2004 | Snyder et al. ............... 410/104 |

* cited by examiner

Primary Examiner—Stephen Gordon
(74) Attorney, Agent, or Firm—Davis & Bujold, P.L.L.C.

(57) ABSTRACT

A cargo securing system comprising an elongate base member having a front surface and a rear surface with a plurality of attachment holes to facilitate attachment of the base member to a desired surface. An elongate slot is formed in base member and the slot communicates with an elongate recess. At least one adjustable member, having an enlarged head and a leg extending from the head, is accommodated by the recess. The head of the adjustable member is sized to slide along the recess of the base member with the leg projecting through and being freely slidable along the slot to facilitate sliding movement of the adjustable member relative to the base member. The base member carries a first interlocking structure and the adjustable member carries a mating second interlocking structure. When the first and second interlocking structures engages with one another, the adjustable member is retained at a desired position relative to the base member.

17 Claims, 6 Drawing Sheets

WALL MOUNTED CARGO SECURING SYSTEM

FIELD OF THE INVENTION

The present invention relates to improvements concerning a cargo securing system.

BACKGROUND OF THE INVENTION

A variety of different cargo securing systems and cargo securing systems and apparatuses are currently available to facilitate securing cargo in a trailer, a mobile home, a truck bed or some other vehicle. However, many of these cargo securing systems are not readily adjustable to accommodate different sized components, objects, cargo, luggage, or other objects, etc.

SUMMARY OF THE INVENTION

Wherefore, it is an object of the present invention to overcome the above mentioned shortcomings and drawbacks associated with the prior art.

Another object of the present invention is to provide a cargo securing system which is easily mounted to a desired wall or surface and accommodates has at least one adjustable member, and preferably two or more adjustable members, which are readily adjustable to accommodate a wide variety of cargo, luggage, component(s), item(s), object(s), etc.

A further object of the present invention is to provide a cargo securing system with a plurality of different types of adjustable members to facilitate secure attachment of virtually any desired cargo, luggage, component(s), item(s), object(s), etc.

Yet another object of the present invention is to provide adjustable members, for a cargo securing system, which have various components connected to a free end thereof to facilitate secure attachment of virtually any type of cargo, luggage, component, item, object, etc.

A still further object of the present invention is to provide a cargo securing system which is relative simple and inexpensive to manufacture and relatively easy to utilize.

The present invention also relates to a cargo securing system comprising an elongate base member having a front surface and a rear surface with a plurality of attachment holes to facilitate attachment of the base member to a desired surface; and an elongate slot and an elongate recess being formed in the base member such that the slot communicates with the recess; at least one adjustable member having an enlarged head and a leg extending from the head, the head being sized to slide along the recess of the base member with the leg projecting through and being freely slidable along the slot to facilitate sliding movement of the adjustable member relative to the base member; and a rearwardly facing surface of the recess carrying a first interlocking structure and the adjustable member carrying a mating second interlocking structure, and when the first interlocking structure engages with the second interlocking mating structure, the adjustable member is retained at a desired position relative to the base member.

The present invention also relates to a kit of parts a kit of parts for a cargo securing system, the kit comprising a plurality of fastening members; a plurality of strap members; a plurality of elongate base members, with each base member having a front surface and a rear surface with a plurality of attachment holes to facilitate attachment of the base member to a desired surface; and an elongate slot and an elongate recess being formed in the base member such that the slot communicates with the recess; a plurality of adjustable members with each adjustable member having an enlarged head and a leg extending from the head, the head being sized to slide along the recess of one of the base members with the leg projecting through and being freely slidable along the slot to facilitate sliding movement of the adjustable member relative to that base member; and a rearwardly facing surface of each recess carrying a first interlocking structure and each of the plurality of adjustable members carrying a mating second interlocking structure, and when the first interlocking structure of one of the base members engages with the second interlocking mating structure of one of the adjustable members, that adjustable member is retained at a desired position relative to the respective base member.

The present invention also relates to a method a method of securing cargo with a cargo securing system, the method comprising the steps of providing an elongate base member with front and rear surfaces and with a plurality of attachment holes to facilitate attachment of the base member to a desired surface; and forming an elongate slot and an elongate recess in the base member such that the slot communicates with recess; providing at least one adjustable member having an enlarged head and a leg extending from the head, with the head being sized to slide along the recess of the base member with the leg projecting through and being freely slidable along the slot to facilitate sliding movement of the adjustable member relative to the base member; and carrying a first interlocking structure on a rearwardly facing surface of the recess and carrying a mating second interlocking structure on the adjustable member, and retaining the adjustable member at a desired position relative to the base member when the first interlocking structure engages with the second interlocking mating structure.

BRIEF DESCRIPTION OF THE DRAWINGS

The invention will now be described, by way of example, with reference to the accompanying drawings in which.

DETAILED DESCRIPTION OF THE INVENTION

Figure 1:
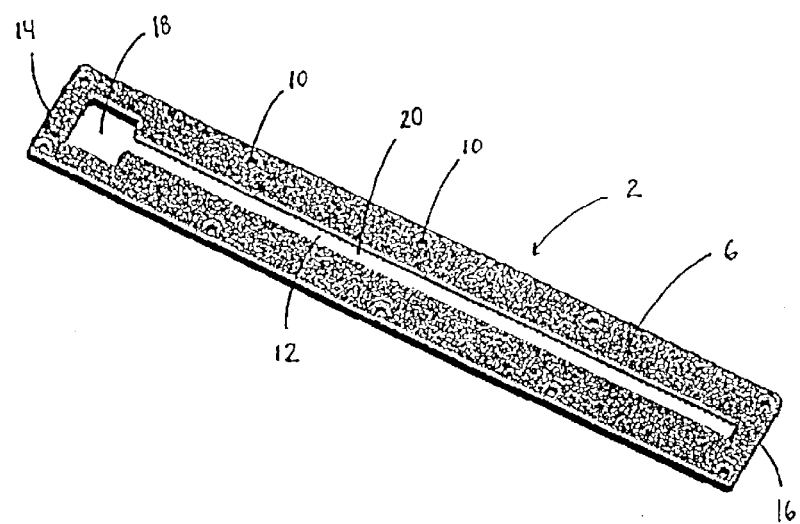
FIG. 1 is a diagrammatic front perspective view of an embodiment of a base member of the cargo securing system.

Turning now to FIGS. 1–4C and 9–11, a brief description concerning the basic components of the present invention will first be provided and this will then be followed by a detailed description thereof. As can be seen in those Figures, the cargo securing system generally comprises two or more base members 2 and each base member 2 has at least one adjustable member 4 which is longitudinally movable along the length of the base member 2. A rope, a strap, an elastic cord or some other conventional and well known strap member 3 interconnects typically two or more desired adjustable members 4, typically supported by different base members 2, with one another to fasten the desired cargo, luggage, component(s), item(s) or other object(s) to a vehicle or trailer using the cargo securing system 1. As such strap members 3 are conventional and well known in the art, a further detailed description concerning the same will not be provided.

Figure 2:
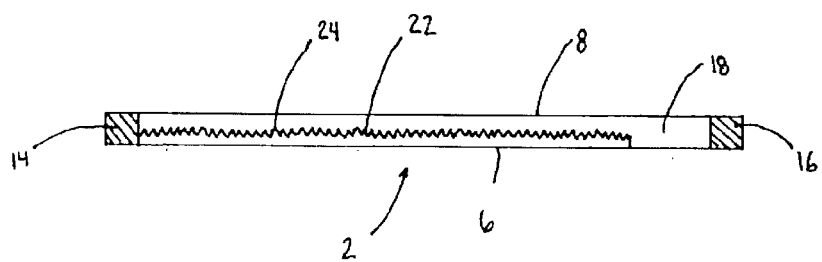
FIG. 2 is a diagrammatic cut away view, along section line 2—2 of FIG. 3, of the rear side of the base member.
Figure 3:
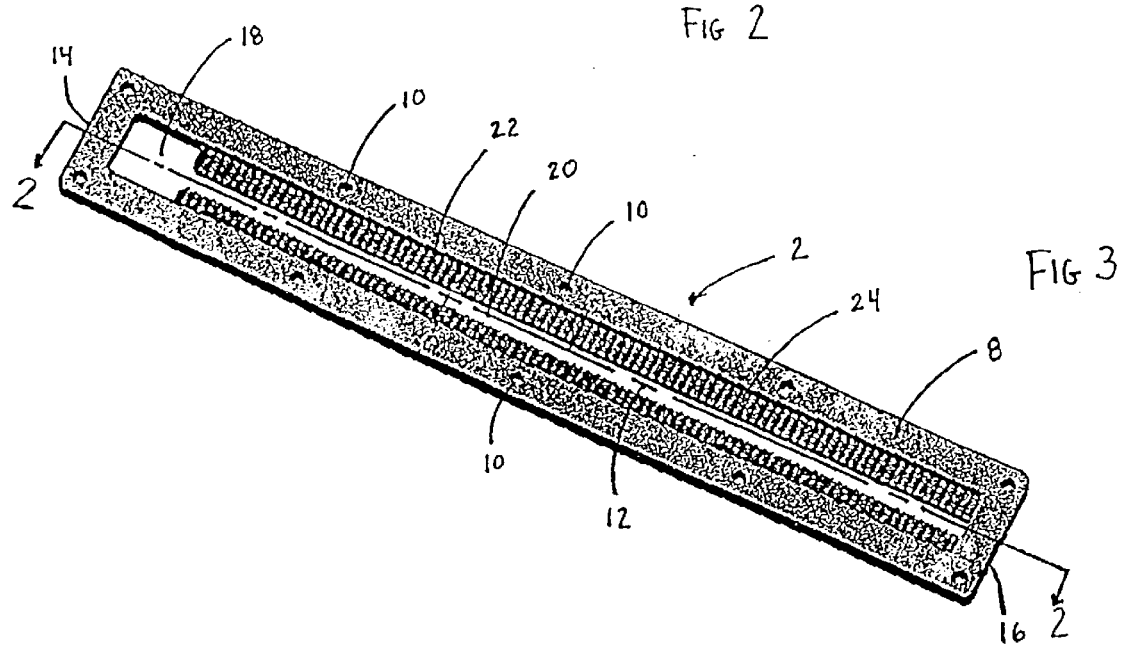
FIG. 3 is a diagrammatic rear perspective view of the base member of the cargo securing system.

With reference to FIGS. 1–3, a detailed description of the base member 2 will now be provided. The base member 2 is a generally elongate planar member which has spaced apart opposed front and rear surfaces 6, 8. The rear surface 8 is generally planar to facilitate abutting engagement of the rear surface 8 of the base member 2 with a desired wall or supporting surface S. A plurality of spaced apart through bores 10 extend completely through the base member 2 from the front surface 6 to the rear surface 8. The plurality of through bores 10 are located about the perimeter of the base member 2 to facilitate secure attachment of the base member 2 to the desired wall or supporting surface by a plurality of screws, bolts, nails or some other conventional fastening device or means. The plurality of through bores 10 are preferably equally spaced around the perimeter of the base member 2.

A centrally located elongate slot 12 extends through the base member 2 from the front surface 6 to the rear surface 8 and extends longitudinally along a longitudinal length of the base member 2 from adjacent a first end wall 14 to a location adjacent the opposite second end wall 16. In addition, the base member 2 has an enlarged access opening 18 which is dimensioned larger than the elongate slot 12 to facilitate passage of the adjustable member(s) 4 therethrough and the purpose and function of this access opening will be described in further detail below. Preferably, the access opening 18 is located adjacent an end wall 14, 16 of the base member 2 although it is possible for the access opening 18 to be more centrally located. The elongate slot 12 communicates with an elongate recess 20 formed in the rear surface 8 of the base member 2. The elongate recess 20 has a width which is much wider than the width of the elongate slot 12, e.g., the elongate recess 20 has a width which is about two to three times, or possibly as much as about five times or so, the width of the elongate slot 12. A longitudinal, axis of the elongate slot 12 overlies and extends parallel to a longitudinal axis of the elongate recess 20.

A rearwardly facing surface 22 of the elongate recess 20 carries a first component of an interlocking structure 24 thereon (see FIG. 3). The interlocking structure 24 is formed on and generally extends along the entire longitudinal length of the rearwardly facing surface 22 of the base member 2 with the elongate slot 12 being centrally located with respect to the elongate recess 20. The interlocking structure 24 may be, for example, a desired teething or some other consistently arranged formation or repeating pattern which facilitates retaining the adjustable member 4 in a desired adjusted position relative to the base member 2. To facilitate retention of the adjustable member 4 at an adjusted position, the adjustable member 4 (see FIGS. 5–8) has a forward facing surface 26 which carries a mating interlocking structure 28 which mates with the interlocking structure 24 of the base member 2 (see FIGS. 4A–C), and a further detailed description concerning such features will follow.

It is to be appreciated that the number and/or spacing of the through bores 10, provided in the base member 2, can vary depending upon the overall length of the base member 2 and/or the particular application of the cargo securing system 1. For example, if the base member 2 is relatively long and/or is to be utilized to support heavy cargo, luggage, component(s), item(s) or other object(s), additional through bores 10 may be provided in the base member 2 to facilitate secure fastening of the base member 2 to the wall or surface S. Alternatively, for shorter length base members 2, a lesser number of through bores 10 may be required to fasten the base member 2 to a supporting wall or surface.

The base member 2 typically has a width of between 1 and 4 inches, preferably about 2 inches, a height of between ¼ and 1 inches, preferably about ½ inch, and a length of between 6 and 60 inches, preferably about 36 inches. The elongate slot 12 typically has width of between ⅛ and ½ inches, preferably about ¼ of an inch, a depth of between ⅛ and ½ of an inch, preferably about ¼ of an inch and a length of between 4 and 58 inches, preferably about 35 inches. The elongate recess 20 typically has width of between ½ and 3 inches, preferably about 1 inch, and a depth of between ⅛ and ½ of an inch, preferably about ¼ of an inch and a length of between 4 and 58 inches, preferably about 35 inches. The enlarged opening 18 typically has a width of between ½ and 3 inches, preferably about 1 inch and a length of between ½ and 3 inches, preferably about 1 inch.

With reference now to FIGS. 5–8, a detailed description various embodiments of the adjustable member 4 will now be described. As can be seen in these Figures, each adjustable member 4 generally has a T-shaped transverse cross-section. A head 30 of the adjustable member 4 is substantially rectangular or square in shape and sized slightly smaller than the enlarged opening 18 provided in the base member 2 to facilitate unobstructed passage of the head 30 of the adjustable member 4 through the enlarged opening 18. A central leg 32 extends substantially perpendicular to the head 30 and has a width dimension which is slightly less than the width dimension of the elongate slot 12 of the base member 2 to facilitate free and unobstructed sliding to and fro movement of the central leg 32 of the adjustable member 4 along the elongate slot 12 when the head 30 of the adjustable member 4 is accommodated by or within the elongate recess 20.

The forward facing surface 26 of the adjustment member 4, located on both opposed sides of the central leg 32, carries a mating interlocking structure 28 which is designed and located to engage with the interlocking structure 24, provided on the rearwardly facing surface 22 of the elongate recess 20 of the base member 2, and restrain further movement of the adjustment member 4 relative to the base member 2. The mating interlocking structure 28 is a mating teething or mating consistently arranged formation or repeating pattern which facilitates retaining the adjustable member 4 in a desired adjusted position relative to the base member 2. The thickness of the head 30, including the raised mating interlocking structure 28, is less than the depth dimension of the elongate recess 20 in order to provide adequate clearance of the head 30 within the elongate recess 20 and facilitate sliding adjustable movement of the adjustable member 4 relative to the base member 2.

A remote free end 34 of the central leg 32 is provided with at least one eyelet 36 which facilitates attachment of a desired strap member 3 thereto. Alternatively, a pair of spaced apart eyelets 36 (see FIG. 8) can be provided or formed in the remote free end 34 of the central leg 32 of the adjustable member 4. It is to be appreciated that the remote free end 34 of the adjustable member 4 can also have a variety of difference shapes, sizes, components, etc. For example, the remote free end 34 of the central leg 32 may be hook shaped (see FIG. 7) to facilitate hooking or hanging of desired cargo, luggage, component(s), item(s) or other object(s). Alternatively, a variety of other convention and well known shapes or formations, depending upon the particular application of the cargo securing system 1, may be formed in or at the remote free end 34 of the central leg 32 to facilitate securing desired cargo, luggage, component(s), item(s) or other object(s) to the system.

To adjust or move the adjustable member 4 relative to the base member 2, the adjustable member 4 is first moved away from the front surface 6 of the base member 2 toward the wall or supporting surface S so that a rear surface 52 of the adjustable member 4 is in abutting engagement with the wall or supporting surface S. When the adjustable member 4 is so positioned, the head 30 has sufficient clearance with respect to the elongate recess 20 to permit sliding movement of the adjustable member 4 relative to the base member 2. Once the adjustable member 4 is moved to a desired location relative to the base member 2, the adjustable member 4 is moved in a direction away from the wall or supporting surface S toward the front surface 6 of the base member 2 to space the rear surface 52 of the adjustable member 4 away from the wall or supporting surface S. As result of such movement, the mating interlocking structure 28 of the adjustable member 4 is brought into mating engagement with the interlocking structure 24 carried by the rearwardly facing surface 22 of the elongate recess 20 of the base member 2 to secure and maintain the adjustable member 4 in that adjusted position. Once tension is applied to the adjustable member 4, e.g., for example, by the strap member 3 attached to the eyelet 36 of the adjustable member 4, the adjustable member 4 is prevented from moving from this position because of the interlocking structure 24, 28 and the tension applied by the strap member 3.

Figure 4A:
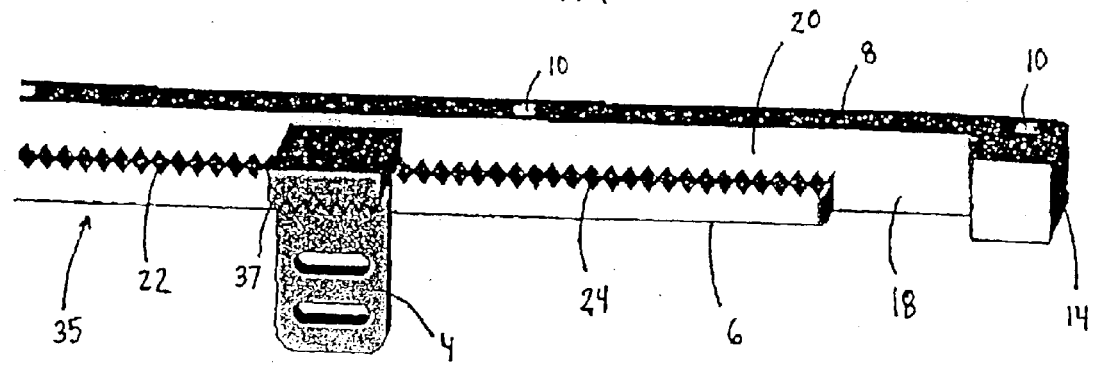
FIG. 4A is a cut away diagrammatic perspective view showing one embodiment of the repeating pattern for interlocking the base member with the adjustable member.
Figure 4B:
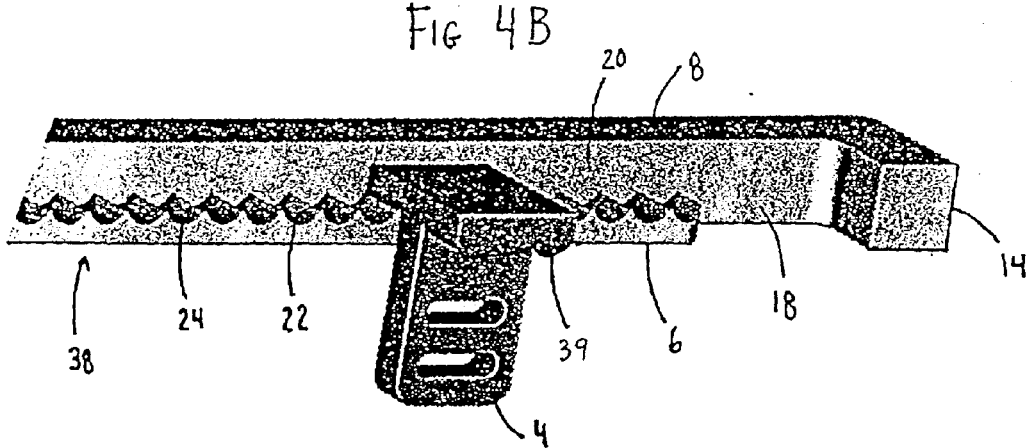
FIG. 4B is a cut away diagrammatic perspective view showing a second embodiment of the repeating pattern for interlocking the base member with the adjustable member.
Figure 4C:
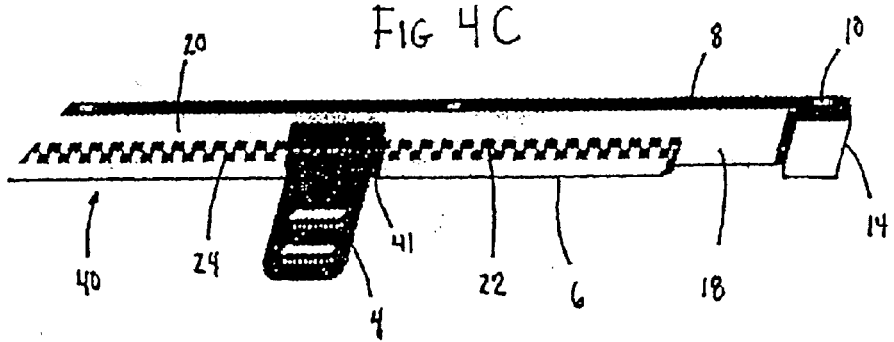
FIG. 4C is a cut away diagrammatic perspective view showing a third embodiment of the repeating pattern for interlocking the base member with the adjustable member.
Figure 5:
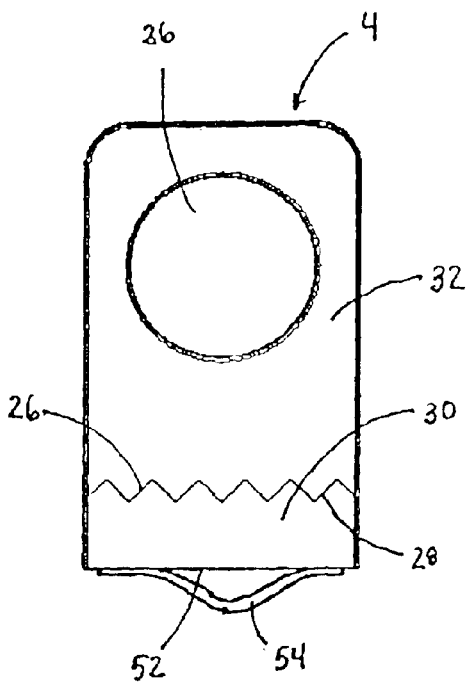
FIG. 5 is a side elevational view of an adjustable member equipped with a spring mechanism for biasing the adjustable member into engagement with the base member.
Figure 6:
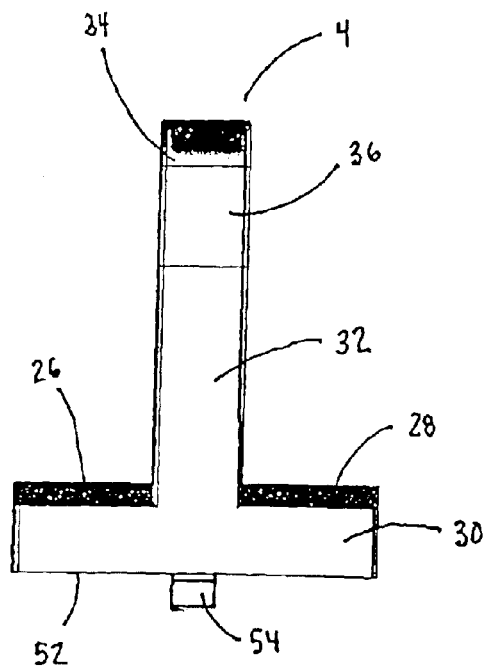
FIG. 6 is a front elevation view of the adjustable member of FIG. 5.
Figure 7:
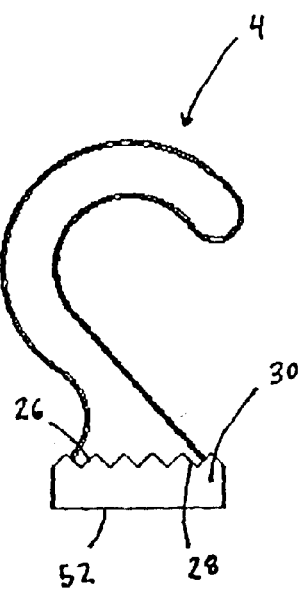
FIG. 7 is a side elevation view of another embodiment of the adjustable member.
Figure 8:
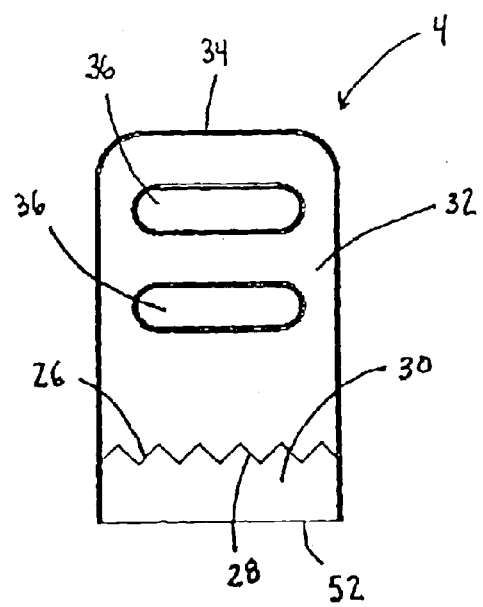
FIG. 8 is a side elevation view of a further embodiment of the adjustable member.

As can be seen in FIG. 4A, according to one embodiment, the rearwardly facing surface 22 of the elongate recess 20 of the base member 2 is provided with a uniform, repeating saw tooth pattern 35 which extends along the entire length of the elongate slot 12, on both sides of the elongate recess 20, while the forward facing surface 26 of the adjustable member 4 is provided with a mating or cooperating uniform, repeating saw tooth pattern 37. In FIG. 4B, the rearwardly facing surface 22 of the elongate recess 20 of the base member 2 is provided with a uniform, repeating wave pattern 38 which extends along the entire length of the elongate slot 12, on both sides of the elongate recess 20, while the forward facing surface 26 of the adjustable member 4 is provided with a mating or cooperating uniform, repeating wave pattern 39. In the embodiment shown in FIG. 4C, the rearwardly facing surface 22 of the elongate recess 20 of the base member 2 is provided with a uniform, repeating notched pattern 40 which extends along the entire length of the elongate slot 12, on both sides of the elongate recess 20, while the forward facing surface 26 of the adjustable member 4 is provided with a mating or cooperating uniform, repeating notched pattern 41. The peak to peak or valley to valley spacing of the uniform, repeating pattern, for both the elongate recess 20 and the adjustable member 4, can be, for example, 0.125, 0.25, 0.375 or 0.5 of an inch, to facilitate adjustment of the adjustable member 4 to a known desired location. Although the interlocking structure 24, carried by the rearwardly facing surface 22 of the elongate recess 20 of the base member 2, is described as being located on both sides of the elongate recess 20, it is to be appreciated that the interlocking structure 24 may be formed only along one side of the elongate recess 20.

Figure 9:
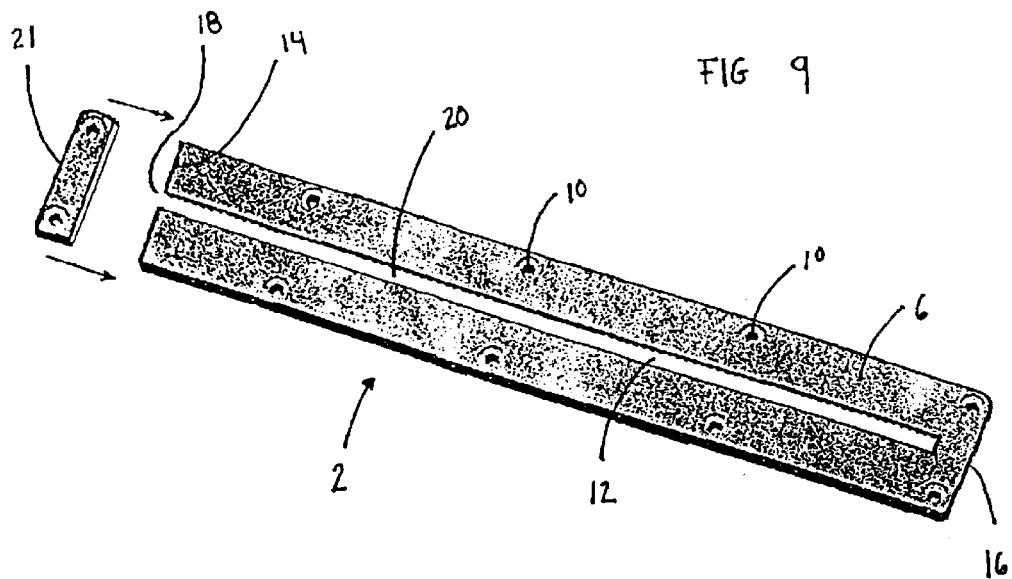
FIG. 9 is a diagrammatic front perspective view showing a second embodiment of the base member of the cargo securing system.

A second embodiment of the base member 2 is shown in FIG. 9. As seen in this Figure, the elongate slot 12 extends from adjacent the first end wall 16 of the base member 2 all the way to and through the other opposite second end wall 14 of the base member 2. According to this embodiment, the enlarged opening 18 comprises the opening formed in the second end wall 14 of the base member 2 and this second end wall 14 facilitates receiving of the adjustable member(s) 4 within the elongate recess 20 and also facilitates removal thereof. To retain the inserted adjustable member(s) 4 within the elongate recess 20, an end cap is secured in abutting engagement with the second end wall 14 to close the enlarged opening 18 in the second end wall 14 of the base member 2 and prevent any adjustable member(s) 4 located therein from becoming inadvertently dislodged or disengaged from the elongate recess 20.

Figure 10:
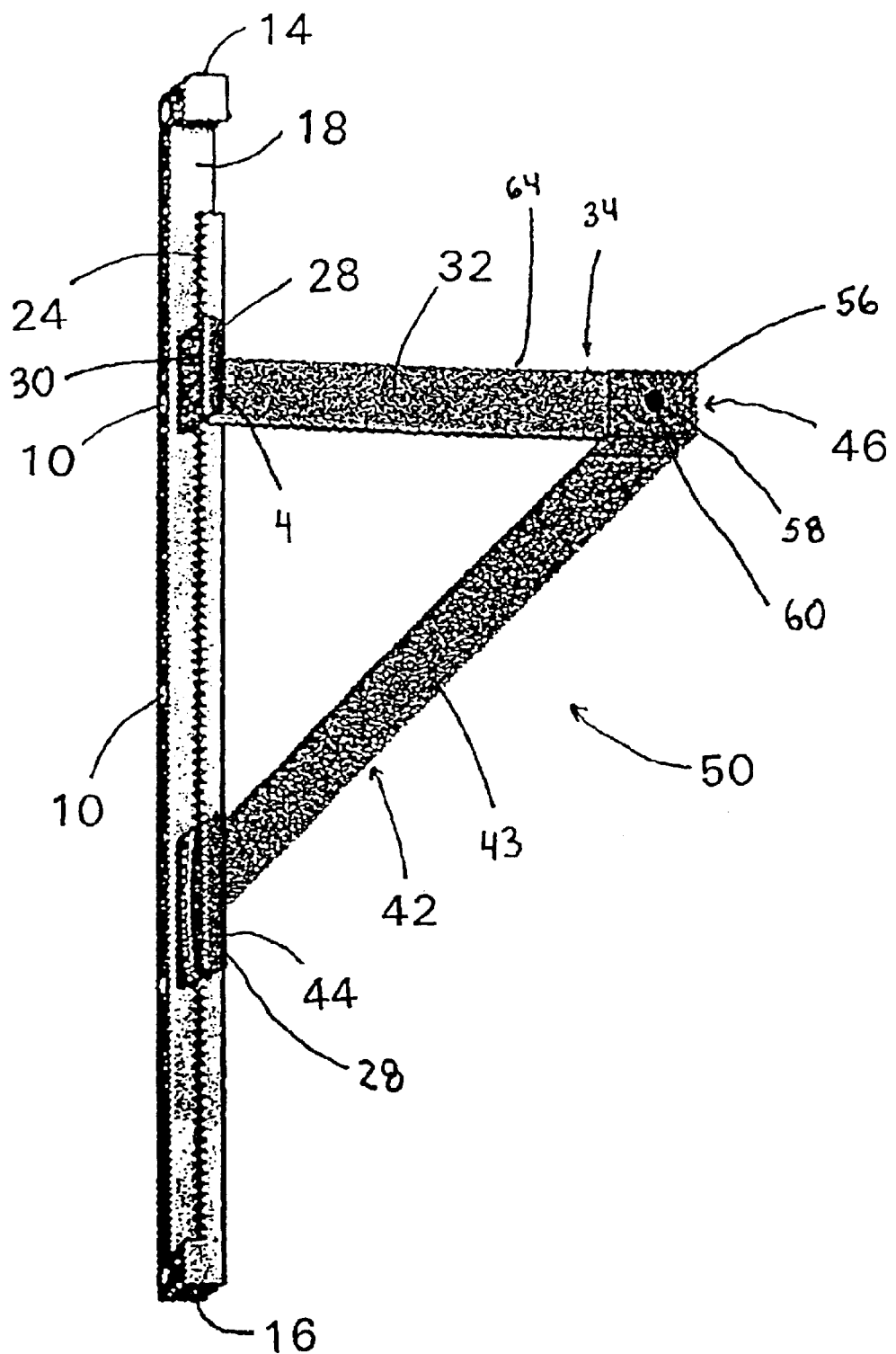
FIG. 10 is a partial, diagrammatic rear perspective view showing an embodiment of the adjusting member for forming a support bracket for the cargo securing system.

With reference now to FIG. 10, a further embodiment of the adjustable member 4 will now be described. As with the previous embodiment, the adjustable member 4 comprises a head 30 with a central leg 32 extending substantially perpendicular to a plane defined by the head 30. However, according to this embodiment, the length of the leg 32 is significantly extended and typically has a length of between 3 and 24 inches, for example. A pin aperture (not shown in detail), or some other coupling structure, is located adjacent the free end 34 of the central leg 32.

Figure 11:
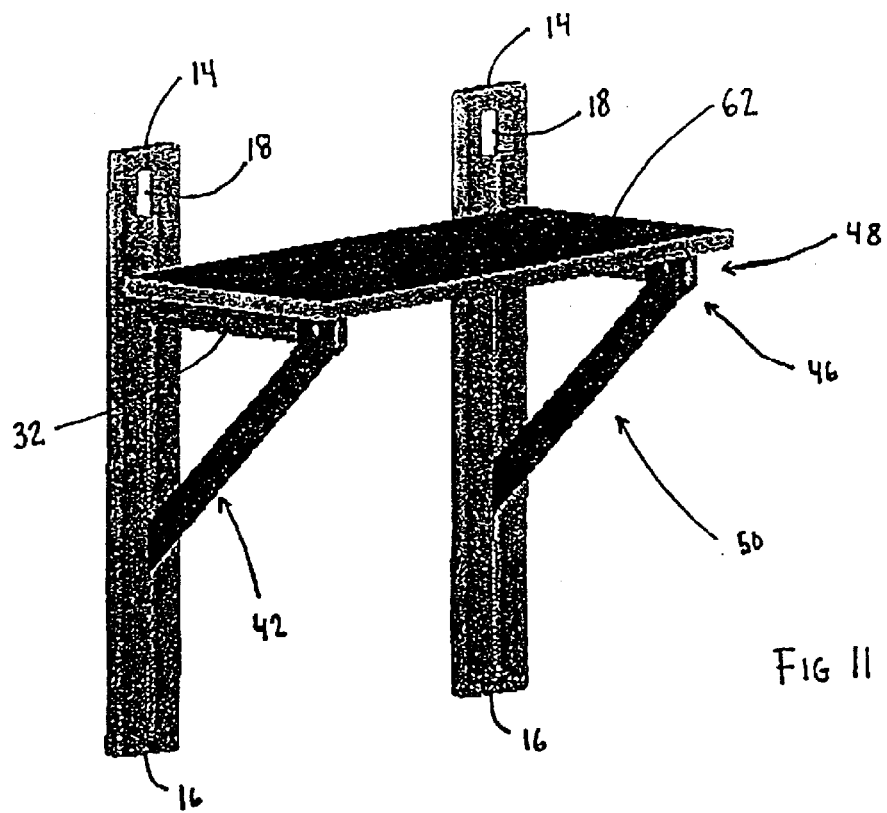
FIG. 11 is a diagrammatic view showing a pair of spaced support brackets for forming a shelf.

The adjustable member 4, according to this embodiment, also includes a support strut 42. The support strut 42 also has a head 44 which is sized to be received by the enlarged opening 18 and to move to and fro along the elongate recess 20 of the base member 2 similar to head 30 of the adjustable member 4. A support leg 43 extends from the head 44 at an angle of between about 45 to about 70 degrees or so relative thereto. A free end 46 of the support leg 43 carries a pair of spaced apart surfaces 56 which are located to receive and sandwich the free end 34 of the central leg 32 therebetween. Each of the support surfaces 56 has an opening 58 therein which align with the pin aperture of the central leg 32. A pin 60 passes through the openings 58 of the support surfaces 56 and pin aperture of the central leg 32 to couple the free ends 34, 46 of the central and support legs 32, 43 to one another. As with the prior embodiments, the interlocking structure 24 of the base member 2 and the mating interlocking structure 28 of the heads 30 and 44 are designed to matingly engage with one another and retain the adjustable member 4 and the support strut 42 in desired positions. When the adjustable member 4 is coupled to the support strut 42, these two components form a support bracket 50 as can be seen in FIG. 10. If desired, a plank or some other generally flat or planar shelving member 62 may be supported by a top surface 64 of the central legs 32 of at least a pair of spaced apart support brackets 50, as can be seen in FIG. 11.

Figure 12:
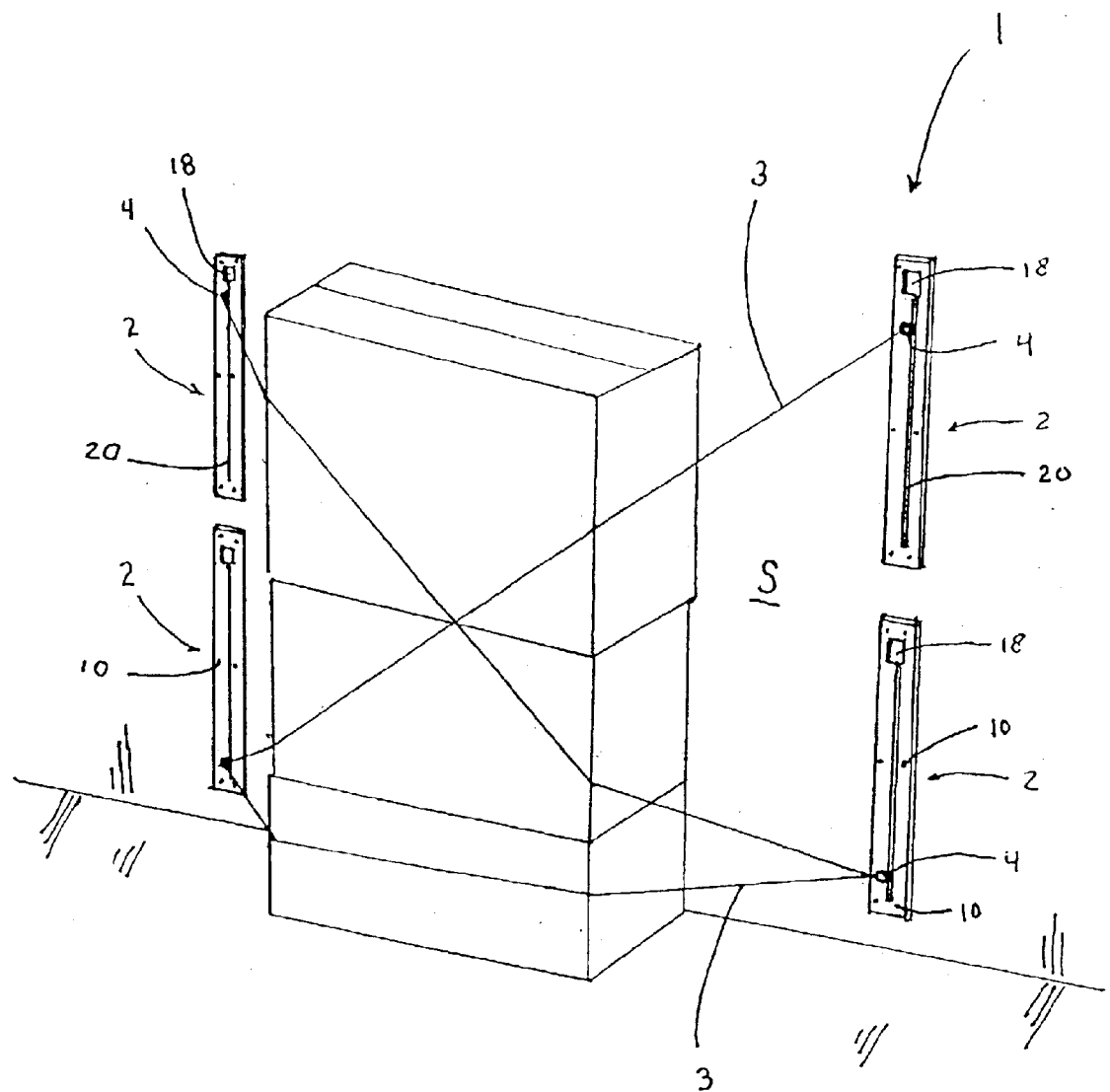
FIG. 12 is a diagrammatic view showing one application of the cargo securing system for securing cargo to a desired surface.

Now use of the present invention will now be described with reference to FIG. 12. An end user will typically fasten one of the base members 2 to a desired wall or some other supporting surface S by attaching a number of fasteners through the plurality of through bores 10 provided in the base member 2 so that the rear surface 8 of the base member 2 is in abutting engagement with the wall or other supporting surface S. One or more additional base members 2 are similarly attached to the wall or supporting surface S in a desired spaced relationship. Thereafter, one or more adjustable members 4 are accommodated by each one of the base members 2 by passing the head 30 of each adjustable member 4 through the enlarged opening 18 in the base member 2 and sliding the head 30, along the elongate recess 20, to a desired adjusted location relative to the base member 2. Once a desired number of adjustable members 4 are supported by each base member 2, the user is then ready to affix one or more strap members 3 to the eyelets 36 of the adjustable members 4 to secure a desired cargo, luggage, component(s), item(s) or other object(s) to the wall or supporting surface S in a conventional tying fashion. If the adjustable member 4 is not located at a proper position, relative to the base member 2, to facilitate the desired attachment of the cargo, luggage, component(s), item(s) or other object(s), the end user will merely push the adjustable member 4 inwardly toward the desired wall or other supporting surface S so that a rear surface 52 of the head 30 is positioned closely adjacent to or in abutting engagement with the wall or supporting surface S. Such movement of the adjustable member 4 sufficiently spaces and disengages the interlocking structure 24 of the base member 2 from the mating interlocking structure 28 of the adjustable member 4 and provides clearance therebetween. When the adjustable member 4 is so positioned, the end user can then freely moved the adjustable member 4, relative to the base member 2, to a new desired adjusted position. Once the adjustable member 4 is moved to its desired adjusted position, the end user will then pull the adjustable member 4 outwardly away from the desired wall or other supporting surface S so that a rear surface 52 of the head 30 is spaced at a maximum distance away from the wall or supporting surface with the interlocking structure 28 of the adjustable member 4 in mating engagement with the interlocking structure 24 of the base member 2 to retain the adjustable member 4 in its desired readjusted position.

It is to be appreciated that a rear surface 52 of the head 30 may be provided with a spring mechanism 54, e.g., a leaf spring, or some other biasing component (see FIGS. 5 and 6), which normally biases the adjustment member 4 away from the wall or supporting surface S into engagement with the interlocking structure 24 of the base member 2 so that the mating interlocking structure 28 of the adjustable member 4 normally engages with the interlocking structure 24 of the elongate recess 20. Such a biasing arrangement will minimize the likelihood that the adjustable member 4 will be inadvertently dislodged from an adjusted position and move relative to the base member 2 to another position.

Once the desired adjustable members are suitably positioned, the end user passes the strap member 3 through the eyelets 36 of the desired ones of the adjustable members 4 and then tugs or pulls on the strap member 3 until a sufficient tension is provided thereon to bias the cargo, luggage, component(s), item(s) or other object(s) to be attached or secured against the wall or surface S. Thereafter the strap member 3 can suitably secured, tied, fastened, etc., to maintain the desired tension on the cargo, luggage, component(s), item(s) or other object(s) to be attached. When removal of the desired cargo, luggage, component(s), item(s) or other object(s) is required, the strap member 3 is untied or released and this generally provides access to the cargo, luggage, component(s), item(s) or other object(s).

It is to be appreciated that the strap member 3 can be string, rope or any other conventional strap member 3 which has an adjustment mechanism which facilitates a desired length adjustment of the strap member 3 while allowing the strap member 3 to be securely fastened in a desired position. As such fastening straps and strap members 3 are conventional and well known in the art, a further detailed description concerning the same is not provided.

Since certain changes may be made in the above described improved cargo securing system without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A cargo securing system comprising:

an elongate base member having a front surface and a rear surface with a plurality of attachment holes to facilitate attachment of the base member to a desired surface; and an elongate slot and an elongate recess being formed in the base member such that the slot communicates with the recess;

at least one adjustable member having an enlarged head and a leg extending from the head, the head being sized to slide along the recess of the base member with the leg projecting through and being freely slidable along the slot to facilitate sliding movement of the adjustable member relative to the base member; and a rearwardly facing surface of the recess carrying a first interlocking structure having a repeating pattern and the adjustable member carrying a mating second interlocking structure having a repeating pattern for mating with the repeating pattern of the first interlocking structure, and when the first interlocking structure engages with the second interlocking mating structure, the adjustable member is retained at a desired position relative to the base member; and the slot extends through the base member from the front surface to the rear surface thereof and extends longitudinally along a length of the base member from adjacent a first end wall to a location adjacent an opposite second end wall.

2. A cargo securing system comprising:

an elongate base member having a front surface and a rear surface along with a plurality of attachment holes to facilitate attachment of the base member to a desired surface; and an elongate slot and an elongate recess being formed in the base member such that the slot communicates with the recess;

at least one adjustable member having an enlarged head and a leg extending from the head, the head being sized to slide along the recess of the base member with the leg projecting through and being freely slidable along the slot to facilitate movement of the adjustable member relative to the base member; and a rearwardly facing surface of the recess carrying a first interlocking structure having a repeating pattern and the adjustable member carrying a mating second interlocking structure having a repeating pattern for mating with the repeating pattern of the first interlocking structure, and when the first interlocking structure engages with the second interlocking mating structure, the adjustable member is retained at a desired position relative to the base member; and the slot has an access opening therein which is dimensioned larger than the slot to facilitate passage of the adjustable member therethrough.

3. The securing system according to claim 1, wherein the slot extends parallel to and overlies the recess, and the recess has a width which is wider than a width of the slot.

4. The securing system according to claim 2, wherein the head is substantially rectangular in shape and the adjustable member has a generally T-shaped transverse cross-section, the head is smaller in size than the access opening provided in the base member to facilitate unobstructed passage of the head through the access opening and into the recess.

5. The securing system according to claim 1, wherein the leg extends substantially perpendicular to the head and has a width dimension smaller than a width dimension of the slot to facilitate free and unobstructed movement of the leg with respect to the slot.

6. The securing system according to claim 1, wherein a forward facing surface of the adjustable member, located on two opposed sides of the leg, carries the second interlocking structure which is located to engage with the first interlocking structure of the base member and restrain further movement of the adjustable member relative to the base member.

7. The securing system according to claim 1, wherein a thickness of the head, including the second interlocking structure, is less than a depth dimension of the recess to provide adequate clearance of the head within the recess and facilitate adjustable movement of the adjustable member relative to the base member.

8. The securing system according to claim 7, wherein a rear surface of the enlarged head has a spring mechanism to facilitate biasing of the second interlocking structure of the adjustable member into engagement with the first interlocking structure of the base member.

9. The securing system according to claim 5, wherein at least one eyelet is provided adjacent a remote end of the leg, and the at least one eyelet facilitates attachment of a desired strap member to the adjustable member.

10. The securing system according to claim 5, wherein a hook is provided adjacent a remote end of the leg.

11. The securing system according to claim 1, the repeating pattern of the rearwardly facing surface of the recess is a notched pattern and the repeating pattern of the adjustable member is a notched pattern.

12. A cargo securing system comprising:

an elongate base member having a front surface and a rear surface along with a plurality of attachment holes to facilitate attachment of the base member to a desired surface; and an elongate slot and an elongate recess being formed in the base member such that the slot communicates with the recess;

at least one adjustable member having an enlarged head and a leg extending from the head, the head being sized to slide along the recess of the base member with the leg projecting through and being freely slidable along the slot to facilitate movement of the adjustable member relative to the base member; and a rearwardly facing surface of the recess carrying a first interlocking structure having a repeating pattern and the adjustable member carrying a mating second interlocking structure having a repeating pattern for mating with the repeating pattern of the first interlocking structure, and when the first interlocking structure engages with the second interlocking mating structure, the adjustable member is retained at a desired position relative to the base member; and the repeating pattern of the rearwardly facing surface of the recess is a saw tooth pattern and the repeating pattern of the second interlocking mating structure of the adjustable member is a saw tooth pattern.

13. The securing system according to claim 1, wherein the repeating pattern of the rearwardly facing surface of the recess is a wave pattern and the repeating pattern of the adjustable member is a wave pattern.

14. The securing system according to claim 4, wherein the repeating pattern of the rearwardly facing surface of the recess is a notched pattern and the repeating pattern of the second interlocking mating structure of the adjustable member is a notched pattern.

15. The securing system according to claim 1, wherein a free end of the adjustable member is coupled to a support strut to form a support bracket for supporting a shelving member.

16. The securing system according to claim 15, wherein the support strut comprises the head which is sized to be received by an access opening and move to and fro along the elongate recess, and the support strut extends from the head at an angle of between about 45 to about 70 degrees.

17. The securing system according to claim 1, wherein a free end of a support strut carries a pair of spaced apart surfaces which are located to receive and sandwich a free end of the leg therebetween.

* * * * *